(12) United States Patent
Akkarakaran et al.

(10) Patent No.: US 11,470,570 B2
(45) Date of Patent: Oct. 11, 2022

(54) SYNCHRONIZATION SIGNAL BLOCK (SSB)-BASED POSITIONING MEASUREMENT SIGNALS

(71) Applicant: QUALCOMM Incorporated, San Diego, CA (US)

(72) Inventors: Sony Akkarakaran, Poway, CA (US); Tao Luo, San Diego, CA (US); Alexandros Manolakos, San Diego, CA (US); Guttorm Ringstad Opshaug, Redwood City, CA (US); Joseph Binamira Soriaga, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/814,971

(22) Filed: Mar. 10, 2020

(65) Prior Publication Data

US 2020/0213968 A1 Jul. 2, 2020

Related U.S. Application Data

(63) Continuation of application No. 16/440,758, filed on Jun. 13, 2019, now Pat. No. 11,399,356.

(30) Foreign Application Priority Data

Jun. 26, 2018 (GR) ............................. 20180100283

(51) Int. Cl.
*H04W 64/00* (2009.01)
*H04W 56/00* (2009.01)

(52) U.S. Cl.
CPC ......... *H04W 64/00* (2013.01); *H04W 56/001* (2013.01)

(58) Field of Classification Search
CPC .. H04W 64/00; H04W 56/001; H04L 5/0053; H04L 5/0048; H04L 5/0007
See application file for complete search history.

(56) References Cited

U.S. PATENT DOCUMENTS

2016/0262161 A1* 9/2016 Li ......................... H04L 5/0051
2016/0295374 A1 10/2016 Persson et al.
(Continued)

OTHER PUBLICATIONS

LG Electronics, Discussion on SS block, SS burst set composition and time index indication, 3GPP TSG RAN WG1 Meeting #88bis Spokane, USA Apr. 3-7, 2017 (Year: 2017).*

(Continued)

*Primary Examiner* — Diane D Mizrahi
(74) *Attorney, Agent, or Firm* — Qualcomm Incorporated

(57) ABSTRACT

Disclosed are techniques for utilizing synchronization signal blocks for positioning operations. In an aspect, a transmission point configures a set of synchronization signal blocks to be used as positioning measurement signals, each of the plurality of synchronization signal blocks comprising a primary synchronization signal, a secondary synchronization signal, and one or more physical broadcast channel signals, and transmits the set of synchronization signal blocks on a wireless downlink channel to enable a user device to perform a positioning measurement of at least one of the set of synchronization signal blocks. In an aspect, the user device receives, from the transmission point, the plurality of synchronization signal blocks on the wireless downlink channel, receives, from the transmission point, an indication of the set of synchronization signal blocks to be used as positioning measurement signals, and performs a positioning measurement of at least one of the set of synchronization signal blocks.

39 Claims, 7 Drawing Sheets

(56) References Cited

U.S. PATENT DOCUMENTS

| | | | | |
|---|---|---|---|---|
| 2017/0373745 | A1* | 12/2017 | Park | H04B 7/0478 |
| 2018/0048444 | A1 | 2/2018 | Park et al. | |
| 2019/0394747 | A1 | 12/2019 | Akkarakaran et al. | |
| 2020/0137700 | A1* | 4/2020 | Zhang | H04W 76/27 |
| 2020/0169896 | A1* | 5/2020 | Li | H04W 72/046 |
| 2020/0396710 | A1* | 12/2020 | Wigren | H04W 64/00 |
| 2020/0404537 | A1* | 12/2020 | Harada | H04J 11/0073 |
| 2021/0153049 | A1* | 5/2021 | Cui | H04L 5/0048 |

OTHER PUBLICATIONS

Interdigital Inc: "On SS Block and Burst Set Design and Indication", 3GPP Draft; R1-1714129 On SS Block and Burst Set Design and Indication, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017 Aug. 20, 2017 (Aug. 20, 2017), XP051316918, Retrieved from the Internet:URL:http://www.3gpp.org/ftp/Meetings_3GPP_SYNC/RAN1/Docs/ [retrieved on Aug. 20, 2017], Sections 1-4, 4 pages.

International Search Report and Written Opinion—PCT/US2019/037279—ISA/EPO—dated Sep. 4, 2019.

LG Electronics: "Discussion on SS Block, SS Burst set Composition and Time Index Indication", 3GPP Draft; R1-1704862, vol. RAN WG1, No. Spokane, USA; Apr. 3, 2017-Apr. 7, 2017 Apr. 2, 2017, XP051242997, Retrieved from the Internet: URL:http://www.3gpp.org/ftp/Meetings_3GPP_SYNC/RAN1/Docs/ [retrieved on Apr. 2, 2017], Sections 1-3, 8 pages.

NTT Docomo et al., "Remaining Details on Synchronization Signal", 3GPP Draft; R1-1720789, vol. RAN WG1, No. Reno, USA; Nov. 27, 2017-Dec. 1, 2017 Nov. 18, 2017, XP051370218, Retrieved from the Internet: URL:http://www.3gpp.org/ftp/tsg%5Fran/WG1%5FRL1/TSGR1%5F91/Docs/ [retrieved on Nov. 18, 2017], Sections 1-3, 5 pages.

\* cited by examiner

SYNCHRONIZATION SIGNAL BLOCK (SSB)-BASED POSITIONING MEASUREMENT SIGNALS

CROSS-REFERENCE TO RELATED APPLICATION

The present Application for Patent is a continuation of U.S. application Ser. No. 16/440,758, entitled "SYNCHRONIZATION SIGNAL BLOCK (SSB)-BASED POSITIONING MEASUREMENT SIGNALS," filed Jun. 13, 2019, which claims priority under 35 U.S.C. § 119 to Greek Patent Application No. 20180100283, entitled "SYNCHRONIZATION SIGNAL BLOCK (SSB)-BASED POSITIONING MEASUREMENT SIGNALS," filed Jun. 26, 2018, each assigned to the assignee hereof, and expressly incorporated herein by reference in its entirety.

INTRODUCTION

Aspects of this disclosure relate generally to telecommunications, and more particularly to synchronization signal block (SSB)-based positioning measurement signals and the like.

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., LTE or WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of utilizing synchronization signal blocks for positioning operations includes receiving, at a user device from a transmission point, a plurality of synchronization signal blocks on a wireless downlink channel, each of the plurality of synchronization signal blocks comprising a primary synchronization signal, a secondary synchronization signal, and one or more physical broadcast channel signals, receiving, by the user device from the transmission point, an indication of a set of the plurality of synchronization signal blocks to be used as positioning measurement signals, and performing, by the user device, a positioning measurement of at least one of the set of the plurality of synchronization signal blocks.

In an aspect, a method of utilizing synchronization signal blocks for positioning operations includes configuring, by a transmission point, a set of synchronization signal blocks to be used as positioning measurement signals, each of the set of synchronization signal blocks comprising a primary synchronization signal, a secondary synchronization signal, and one or more physical broadcast channel signals, and transmitting, by the transmission point, the set of synchronization signal blocks on a wireless downlink channel to enable a user device to perform a positioning measurement of at least one of the set of synchronization signal blocks.

In an aspect, an apparatus for utilizing synchronization signal blocks for positioning operations includes at least one processor of a transmission point configured to: configure a set of synchronization signal blocks to be used as positioning measurement signals, each of the set of synchronization signal blocks comprising a primary synchronization signal, a secondary synchronization signal, and one or more physical broadcast channel signals, and cause a transmitter of the transmission point to transmit the set of synchronization signal blocks on a wireless downlink channel to enable a user device to perform a positioning measurement of at least one of the set of synchronization signal blocks.

In an aspect, an apparatus for utilizing synchronization signal blocks for positioning operations includes at least one processor of a user device configured to: cause a transceiver of the user device to receive, from a transmission point, a plurality of synchronization signal blocks on a wireless downlink channel, each of the plurality of synchronization signal blocks comprising a primary synchronization signal, a secondary synchronization signal, and one or more physical broadcast channel signals, cause the transceiver to receive, from the transmission point, an indication of a set of the plurality of synchronization signal blocks to be used as positioning measurement signals, and cause the transceiver to perform a positioning measurement of at least one of the set of the plurality of synchronization signal blocks.

In an aspect, an apparatus for utilizing synchronization signal blocks for positioning operations includes a means for processing of a transmission point configured to: configure a set of synchronization signal blocks to be used as positioning measurement signals, each of the set of synchronization signal blocks comprising a primary synchronization signal, a secondary synchronization signal, and one or more physical broadcast channel signals, and cause a means for communicating of the transmission point to transmit the set of synchronization signal blocks on a wireless downlink channel to enable a user device to perform a positioning measurement of at least one of the set of synchronization signal blocks.

In an aspect, an apparatus for utilizing synchronization signal blocks for positioning operations includes a means for processing of a user device configured to: cause a means for communicating of the user device to receive, from a transmission point, a plurality of synchronization signal blocks on a wireless downlink channel, each of the plurality of synchronization signal blocks comprising a primary synchronization signal, a secondary synchronization signal, and one or more physical broadcast channel signals, cause the means for communicating to receive, from the transmission point, an indication of a set of the plurality of synchronization signal blocks to be used as positioning measurement signals, and cause the means for communicating to perform a positioning measurement of at least one of the set of the plurality of synchronization signal blocks.

In an aspect, a non-transitory computer-readable medium storing computer-executable instructions for utilizing synchronization signal blocks for positioning operations includes computer-executable instructions comprising at least one instruction instructing a transmission point to configure a set of synchronization signal blocks to be used as positioning measurement signals, each of the set of synchronization signal blocks comprising a primary synchronization signal, a secondary synchronization signal, and one or more physical broadcast channel signals, and at least one instruction instructing the transmission point to transmit the set of synchronization signal blocks on a wireless downlink channel to enable a user device to perform a positioning measurement of at least one of the set of synchronization signal blocks.

In an aspect, a non-transitory computer-readable medium storing computer-executable instructions for utilizing synchronization signal blocks for positioning operations includes computer-executable instructions comprising at least one instruction instructing a user device to receive, from a transmission point, a plurality of synchronization signal blocks on a wireless downlink channel, each of the plurality of synchronization signal blocks comprising a primary synchronization signal, a secondary synchronization signal, and one or more physical broadcast channel signals, at least one instruction instructing a user device to receive, from the transmission point, an indication of a set of the plurality of synchronization signal blocks to be used as positioning measurement signals, and at least one instruction instructing a user device to perform a positioning measurement of at least one of the set of the plurality of synchronization signal blocks.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. In addition, for each of the aspects described herein, the corresponding form of any such aspect may be implemented as, for example, "logic configured to" perform the described action.

In the following, various aspects of a wireless access network will be described with reference to a multiple-input multiple output (MIMO) system supporting orthogonal frequency-division multiplexing (OFDM) on the downlink. OFDM is a spread-spectrum technique that modulates data over a number of subcarriers in the frequency domain within an OFDM symbol in the time domain. The subcarriers are spaced apart at precise frequencies. The spacing provides "orthogonality" that enables a receiver (e.g., a user equipment (UE)) to recover the data from the subcarriers. In the time domain, a guard interval (e.g., cyclic prefix) may be added to each OFDM symbol to combat inter-OFDM-symbol interference.

Figure 1:
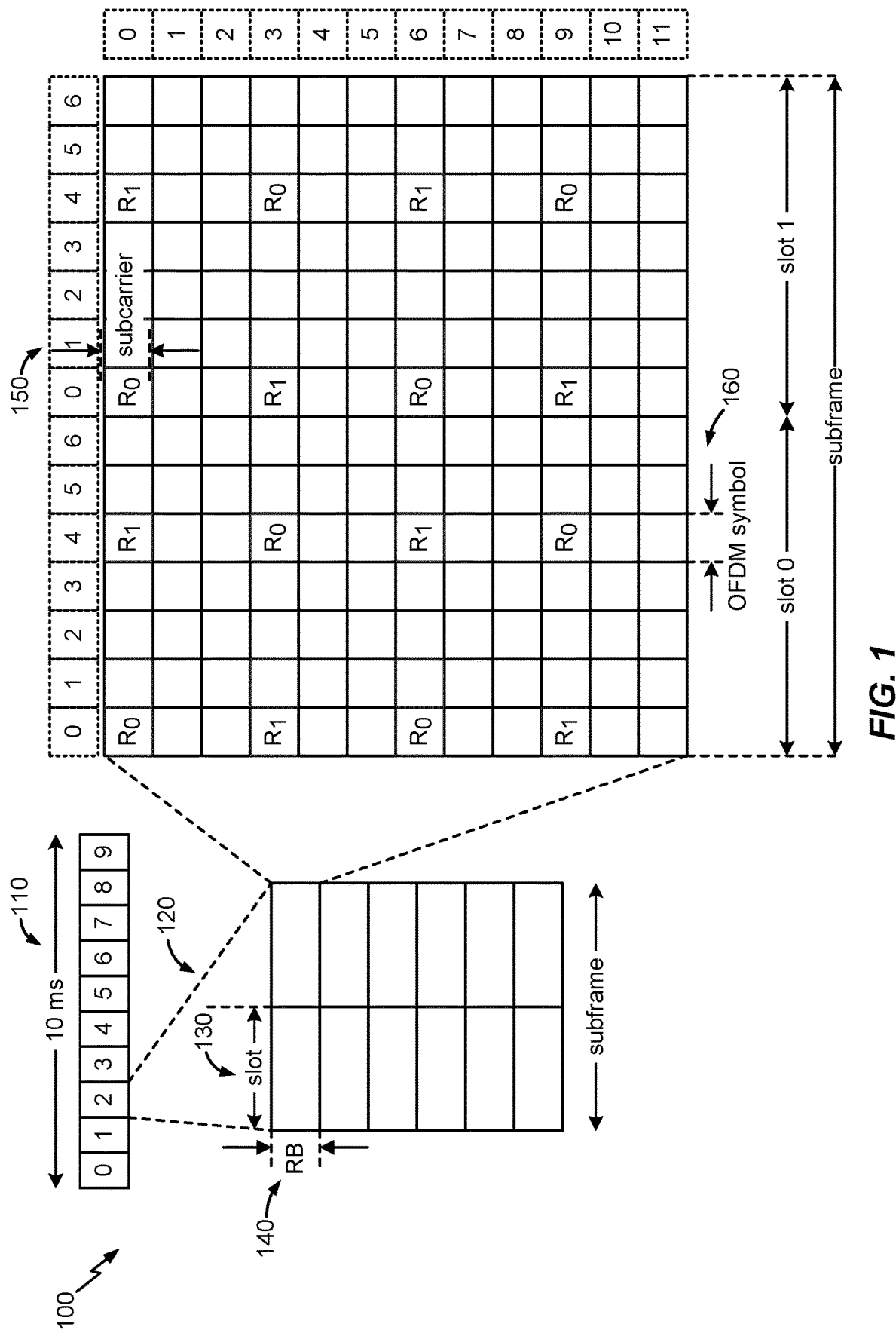
FIG. 1 is a diagram illustrating an example of a frame structure for use in a wireless telecommunications system according to an aspect of the disclosure.

Various frame structures may be used to support downlink and uplink transmissions. FIG. 1 illustrates an example of a downlink frame structure 100 according to an aspect of the disclosure. However, as those skilled in the art will readily appreciate, the frame structure for any particular application may be different depending on any number of factors. In this example, a frame 110 (10 ms) is divided into 10 equally sized subframes 120 (1 ms). Each subframe 120 includes two consecutive time slots 130 (0.5 ms).

A resource grid may be used to represent two time slots 130, each time slot 130 including a resource block (RB) 140. The resource grid may be divided into multiple resource elements (REs). In LTE, an RB contains 12 consecutive subcarriers 150 in the frequency domain and, for a normal cyclic prefix in each OFDM symbol, 7 consecutive OFDM symbols 160 in the time domain, or 84 REs. Some of the REs, as indicated as $R_0$ and $R_1$, include a downlink positioning measurement signal (e.g., positioning reference signals (PRS) in LTE). The positioning measurement signal may include cell-specific reference signals (CRS) (also sometimes called common reference signals) and UE-specific reference signals (UE-RS). UE-RS are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

LTE, and in some cases 5G NR, utilizes OFDM on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal fast Fourier transform (FFT) size may be equal to 128, 256, 512, 1024 or 2048 for a system bandwidth of 1.25, 2.5, 5, 10 or 20 MHz, respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

Figure 2:
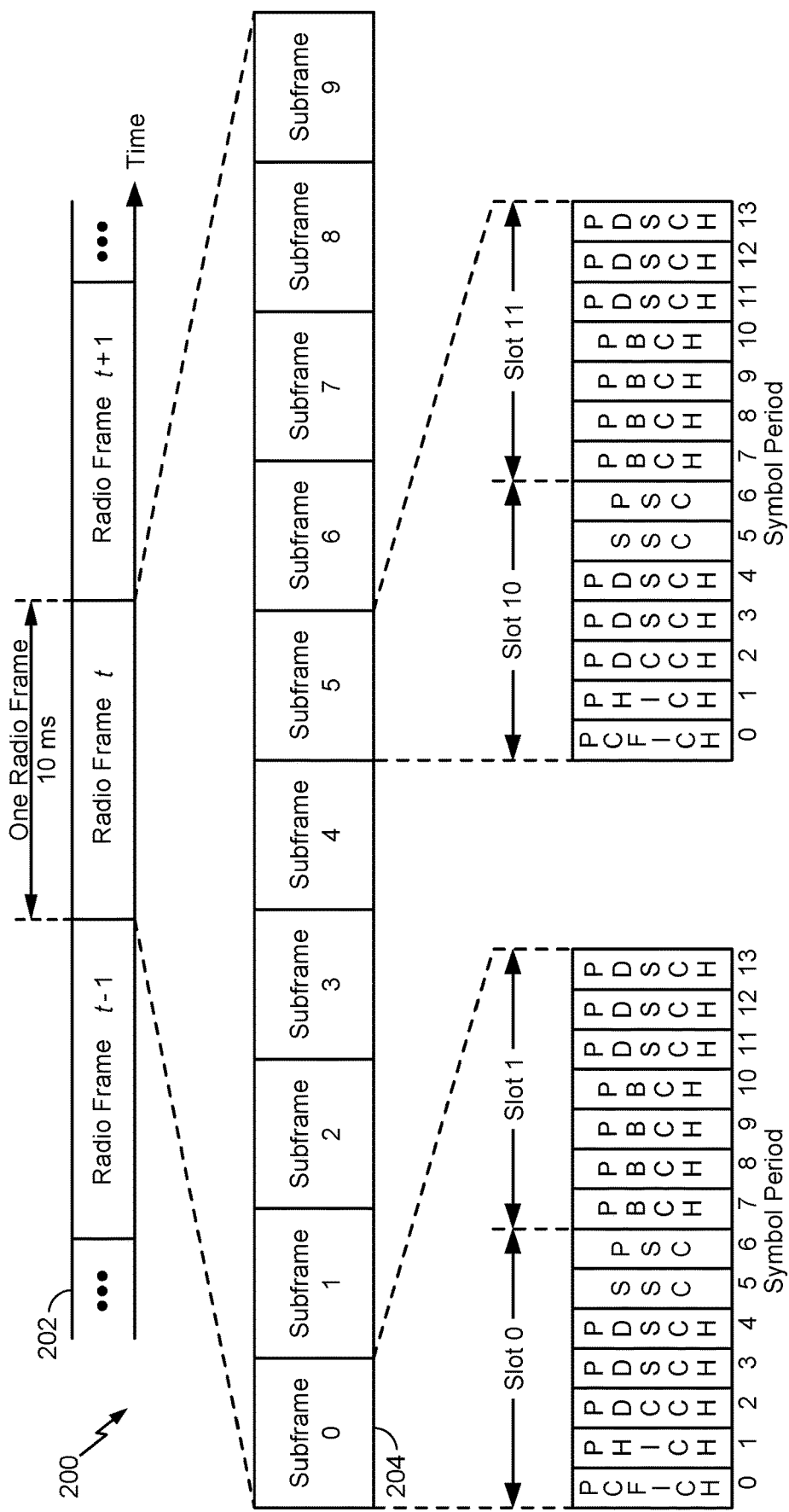
FIG. 2 is a diagram illustrating an example of a downlink frame structure in a wireless telecommunications system according to an aspect of the disclosure.

FIG. 2 shows a downlink frame structure 200 used in LTE, and which may also be used in 5G NR, according to an aspect of the disclosure. The transmission timeline for the downlink may be partitioned into units of radio frames 202 (which may correspond to frame 110 in FIG. 1). Each radio frame 202 may have a predetermined duration (e.g., 10 ms) and may be partitioned into 10 subframes 204 (which may correspond to subframes 120 in FIG. 1) with indices of 0 through 9. Each subframe may include two slots (which may correspond to time slots 130 in FIG. 1). Each radio frame 202 may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L-1. The available time frequency resources may be partitioned into RBs. Each RB may cover N subcarriers (e.g., 12 subcarriers) in one slot.

A base station (referred to as an "eNodeB" in LTE and a "gNodeB" in 5G NR) may send a primary synchronization signal (PSS) and a secondary synchronization signal (SSS) for each cell of the base station. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The base station may send a physical broadcast channel (PBCH) in symbol periods 0 to 3 in slot 1 of subframe 0. The PBCH may carry certain system information.

The base station may send a physical control format indicator channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The base station may send a physical HARQ (hybrid automatic retransmission request) indicator channel (PHICH) and a physical downlink control channel (PDCCH) in the first M symbol periods of each subframe (M=3 in FIG. 2). The PHICH may carry information to support HARQ. The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The base station may send a PDSCH in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The base station may send the PSS, SSS, and PBCH in the center 1.08 MHz of the system bandwidth used by the base station. The base station may send the PCFICH and PHICH across the entire system bandwidth in each symbol period in which these channels are sent. The base station may send the PDCCH to groups of UEs in certain portions of the system bandwidth. The base station may send the PDSCH to specific UEs in specific portions of the system bandwidth. The base station may send the PSS, SSS, PBCH, PCFICH and PHICH in a broadcast manner to all UEs, may send the PDCCH in a unicast manner to specific UEs, and may also send the PDSCH in a unicast manner to specific UEs.

A single instance of a downlink physical channel (e.g., PDCCH, PDSCH) may be sent over multiple slots (which is permitted for certain channels by certain standards), or multiple instances of the downlink physical channel may be sent over multiple slots (e.g., two different packets on two different PDSCHs, or one packet and its HARQ retransmission).

A number of REs may be available in each symbol period. Each RE may cover one subcarrier in one symbol period and may be used to send one modulation symbol, which may be a real or complex value. REs not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A base station may send the PDCCH to the UE in any of the combinations that the UE will search.

Figure 3:
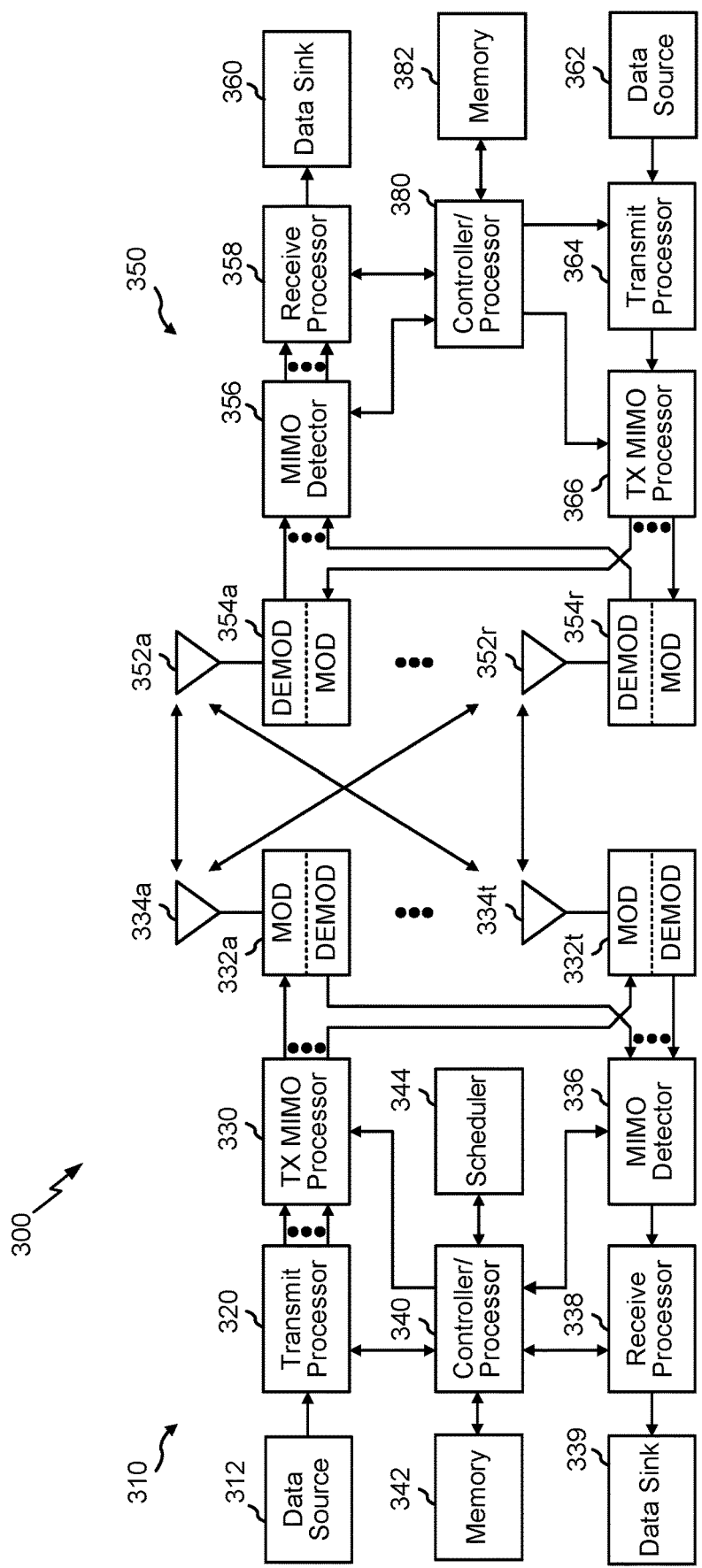
FIG. 3 illustrates an exemplary base station and an exemplary UE in a wireless telecommunications system, according to various aspects.

FIG. 3 is a block diagram 300 of a design of a base station 310 and a UE 350 that may communicate over the physical uplink and downlink channels described above. At the base station 310, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and CRS. A transmit (TX) MIMO processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 350, the antennas 352a through 352r may receive the downlink signals from the base station 310 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 350 to a data sink 360, and provide decoded control information to a controller/processor 380.

On the uplink, at the UE 350, a transmit processor 364 may receive and process data (e.g., for the physical uplink shared channel (PUSCH)) from a data source 362 and control information (e.g., for the physical uplink control channel (PUCCH)) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the base station 310. At the base station 310, the uplink signals from the UE 350 may be received by the antennas 334, processed by the modulators 332, detected by a MIMO detector 336 if applicable, and further processed by a receive processor 338 to obtain decoded data and control information sent by the UE 350. The receive processor 338 may provide the decoded data to a data sink 339 and the decoded control information to the controller/processor 340.

The controllers/processors 340 and 380 may direct the operation at the base station 310 and the UE 350, respectively. The controller/processor 340 and/or other processors and modules at the base station 310 may perform or direct the execution of various processes for the techniques described herein. The processor 380 and/or other processors and modules at the UE 350 may also perform or direct the execution of the techniques described herein. The memories 342 and 382 may store data and program codes for the base station 310 and the UE 350, respectively. A scheduler 344 may schedule UEs for data transmission on the downlink and/or uplink.

In cellular networks, base stations (e.g., base station 310) periodically transmit positioning measurement signals, such as PRS in LTE, to facilitate the determination of position estimates of UEs (e.g., UE 350) in their coverage area. The UEs or another network node (e.g., a base station, location server, etc.) may determine the position estimate based on measurements of positioning measurement signals made by the UEs.

As used herein, a UE may be mobile or stationary, and may communicate with a radio access network (RAN) by wireless means. As used herein, the term "UE" may be referred to interchangeably as an "access terminal" or "AT," a "wireless device," a "wireless terminal," a "subscriber device," a "subscriber terminal," a "subscriber station," a "user terminal" or "UT," a "mobile terminal," a "mobile station," a "mobile device," a "client device," and variations thereof. Generally, UEs can communicate with a core network via the RAN (which includes the base stations serving the UE), and through the core network the UEs can be connected with external networks such as the Internet and with external clients via these external networks. Of course, other mechanisms of connecting to the core network and/or the Internet are also possible for the UEs, such as over wired access networks, WiFi networks (e.g., based on the Institute of Electrical and Electronics Engineers (IEEE) 802.11 specification, etc.) and so on. UEs can be embodied by any of a number of types of devices including but not limited to printed circuit (PC) cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

The term "position estimate" is used herein to refer to an estimate of a position or location of a UE, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "position estimate," a "fix estimate," or the like. The means of obtaining a position estimate may be referred to generically as "positioning," "locating," "position fixing," or the like. A particular solution for obtaining a position estimate may be referred to as a "position solution" or the like. A particular method for obtaining a position estimate as part of a position solution may be referred to as a "position method," a "positioning method," or the like.

In LTE, PRS are transmitted in a configurable number of subframes, which could be one, two, four, or six consecutive subframes out of every 160, 320, 640, or 1280 subframes (ms). The base station (e.g., an enhanced universal terrestrial radio access network (E-UTRAN) in LTE) configures the PRS bandwidth (e.g., a certain number of RBs) and the periodicity of the PRS (e.g., one PRS subframe every 160 subframes). Within a subframe containing PRS, PRS are transmitted on more subcarriers and more OFDM symbols compared to the regular cell-specific reference signals (e.g., PBCH, PSS, and SSS) being sent on an antenna. PRS utilizes more time-frequency resources within a subframe to improve the quality of the UE measurements compared to the use of only the basic cell-specific reference signals.

A PRS carries a pseudo-random sequence, which is a function of various factors such as the physical layer cell identity (PCI), slot number, OFDM symbol number, and the value of the cyclic prefix (CP). The UE detects the PRS from different cells (which may belong to the same base station or to different base stations) in the "neighborhood" of the UE and makes certain measurements of those PRS. Such measurements may include observed time difference of arrival (OTDOA) measurements, such as reference signal time difference (RSTD). RSTD is the relative timing difference between PRS transmitted by a neighbor cell and a reference cell. The UE typically sends these measurements to the serving base station, which processes them in an implementation-specific and non-standardized manner to estimate the position of the UE.

As noted briefly above, 5G (also referred to as "5G New Radio," "5G NR," or simply "NR") is being developed to provide higher data transfer speeds, greater numbers of connections, and better coverage, among other improvements. Consequently, the spectral efficiency, signaling efficiency, and latency of 5G NR mobile communications should be significantly enhanced compared to the current standards.

In LTE, PRS do not use the REs allocated to the PBCH, PSS, and SSS (collectively referred to as the SSB in 5G NR). However, given the design goals of 5G NR, it would be beneficial to design a positioning measurement signal for 5G NR that reuses the SSB design. Conversely, it may be beneficial to design a dedicated positioning measurement signal for 5G NR that may be reused for existing 5G NR functionality (e.g., SSB, channel state information reference signals (CSI-RS), etc.). Such signals are referred to herein as NR-PRS.

Figure 4:
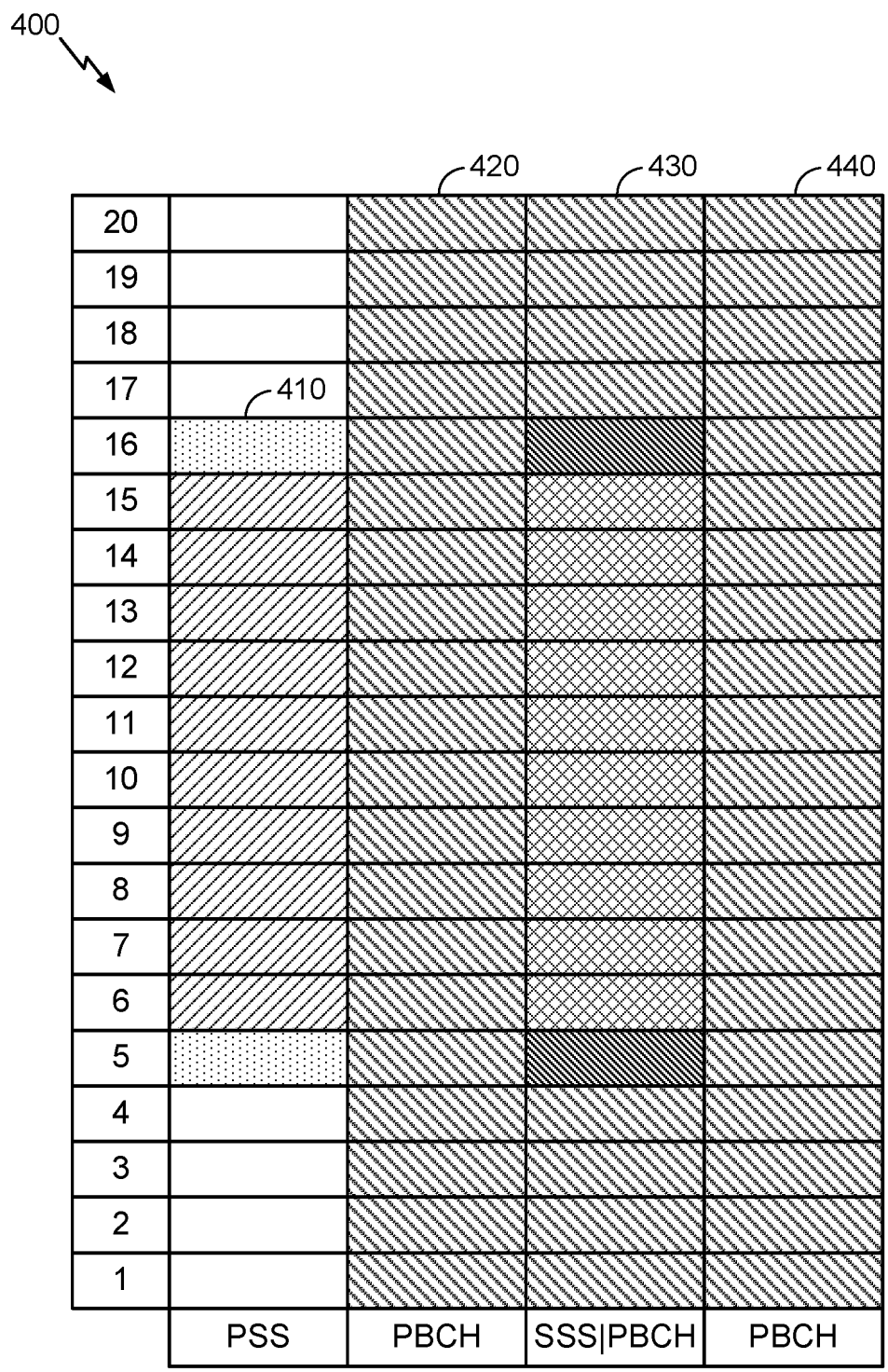
FIG. 4 is a diagram illustrating an example of an SSB according to an aspect of the disclosure.

FIG. 4 illustrates an exemplary SSB 400 in 5G NR. As illustrated in FIG. 4, an SSB 400 comprises four OFDM symbols 410-440 of 20 RBs. As described above, an OFDM symbol is generally 0.5 ms, or half a subframe (also referred to as a "slot"), in length. The first symbol 410 corresponds to the PSS, the second symbol 420 to a PBCH, the third symbol 430 to the SSS, and the fourth symbol 440 to a final PBCH. PBCH RBs also fill up the remaining RBs of the third symbol 430 carrying the SSS, resulting in the 20-RB symbol, as shown. The PSS and SSS in the first and third symbols 410 and 430, respectively, comprise 12 RBs and the PBCHs comprise 20 RBs. The PSS and SSS each comprise 127 subcarriers (each RB comprises 12 subcarriers, hence 12 RBs would be 144 subcarriers, minus some guard subcarriers, thereby reducing the total number of subcarriers to 127). Although not illustrated, the second and fourth symbols 420 and 440 carrying the PBCH include the PBCH demodulation reference signal (DMRS) and the PBCH data. The 20 RBs of each PBCH have a comb-3 DMRS.

In 5G NR, the variable subcarrier spacing (SCS) is 3.75, 15, 30, 60, 120, 240, and 480 kHz with sub-1 GHz of 15 and 30 kHz and sub-6 GHz of 15, 30, and 60 kHz, above 6 GHz of 60 and 120 kHz, and above 24 GHz (referred to as millimeter wave, mmWave, or mmW) of 240 kHz. There may be a maximum of L SSBs in the first 5 ms of each synchronization signal (SS)-burst-set. The burst-set may have a periodicity of 5, 10, 20, 40, 80, or 160 ms, and L=4 at frequencies below 3 GHz, L=8 at frequencies between 3 and 6 GHz, and L=64 at frequencies between 6 and 52.6 GHz. The possible time-locations of the L SSBs within slots are specified in the standard. There is a 6-bit indication in the remaining minimum system information (RMSI, also referred to as system information block 1 (SIB1)), and a full-bitmap (L-bit) in the dedicated radio resource control (RRC) signaling, that can convey which of the L possible SSB locations are actually transmitted.

There are certain limitations to using SSBs for positioning measurement signals that need to be overcome. The first is bandwidth. For example, if using SSS (equal to 17.28 MHz at 120 kHz SCS or 4.32 MHz at 30 kHz SCS) for positioning measurement signals, there are only 12 RBs available, or more precisely, 127 subcarriers (as illustrated in FIG. 4 by third symbol 430). Note that the PSS (transmitted on the first symbol 410) may be shared by multiple base stations, making it hard to use for positioning. As another example, if using PBCH for positioning measurement signals, there are 20 RBs, but the UE may need to first decode the PBCH, or the positioning measurement signals can only use the PBCH DMRS (which occurs once every three subcarriers). However, even the PBCH DMRS has eight possible hypotheses, depending on three bits indicating the SSB index. Thus, reliably identifying the right hypothesis may still need a PBCH decode.

A second limitation is the periodicity and repetition factor. As noted above, in LTE, PRS may utilize one, two, four, or six consecutive subframes out of every 160, 320, 640, or 1280 subframes. LTE narrowband internet of things (NB-IOT) allows M consecutive subframes, where M has a larger range than in LTE. However, as shown in FIG. 1, an SSB is only four symbols, or two subframes, long. A third limitation is that there may be inter-cell interference from neighbor SSBs or other downlink signals (e.g., PDSCH, CSI-RS, etc.).

To address these limitations, the present disclosure provides for a configurable set of SSBs that are usable for positioning measurement signals (referred to herein as "PRS SSBs" or "NR-PRS"). In an aspect, PRS SSBs may be a subset of the cell-defining SSBs that are usually transmitted by a cell to provide information about that cell. Such a set of PRS SSBs can be indicated similar to the way regularly transmitted SSBs are indicated. For example, a set of PRS SSBs may be indicated by a bitmap showing the location of PRS SSBs over the SSB periodicity, or by a bitmap showing the location of PRS SSBs over the PRS periodicity, or by a bitmap showing the location of PRS SSBs within the SSB period that contains them and a bitmap showing the location of SSB-periods containing PRS SSBs. This allows for positioning measurement signal periodicities larger than the maximum SSB periodicity, which could therefore match LTE PRS periodicity (i.e., one, two, four, or six consecutive subframes out of every 160, 320, 640, or 1280 subframes).

To enable positioning measurement signal repetition, multiple SSBs can share the same transmission beam. For example, a base station may transmit 64 SSBs on 32 beams, for a repetition factor of two. This can be explicitly indicated by the SSB-to-SSB quasi-colocation (QCL) relation, in the RMSI, or in a dedicated RRC configuration. Groups of SSB indices sharing the same QCL could be identified either via explicit listing or via rules (e.g., successive pairs of transmitted SSB indices share the same QCL), giving a repetition factor of two. Alternatively, the SSB-to-SSB QCL relation can be implicitly indicated based on the time location of SSBs. For example, it can be assumed that back-to-back SSBs are quasi-collocated. As yet another alternative, this may be indicated by a combination of both. Further, the explicit or implicit indication may apply to all SSBs, or to only the PRS SSBs.

To assist in using post-decoding comb-1 PBCH as positioning measurement signals, PRS SSBs can be placed right before or right after the times at which the PBCH payload can change. This avoids separate wakeups to read master information block (MIB) updates and to read PRS SSBs.

Turning now to the bandwidth limitation of using SSBs for positioning measurement signals, in some cases, the native SSB bandwidth may be enough for some applications. However, when more bandwidth is needed, non-cell-defining SSBs (which have no associated RMSI) can be used. In 5G NR, there is a mechanism for an on-sync-raster non-cell-defining SSB PBCH payload to point to a cell-defining SSB via RMSI control resource set (CORESET) configuration bits in the PBCH payload (which are unnecessary as there is no RMSI). Thus, repurposing these bits, or similarly, any other bit in the PBCH payload that is currently used to convey information (as opposed to bits reserved for future use), to convey positioning measurement signal information will conflict with the operation of a Release-15 5G NR-capable UE.

As a first option, off-raster SSBs can be used for positioning measurement signals. A synchronization raster (e.g., a bitmap) indicates the locations of all SSBs, whether cell-defining or non-cell-defining, that could be transmitted by the base station (e.g., 64 for mmWave, or 8 or 4 for sub-6 GHz frequencies, depending on the frequency bands), or the locations of SSBs actually transmitted by the base station. The synchronization raster has SSB locations back-to-back in frequency, which implies some gap (some number of REs or RBs) between the cell-defining SSBs and the off-raster SSBs (SSBs that are not on the synchronization raster). The use of off-raster locations for additional SSBs would not cause a conflict with UEs following the current specification, as such UEs will not try to detect SSBs in those locations. Thus, the PBCH payload for these additional SSBs can be redefined without affecting legacy 5G NR UEs. In particular, they can contain detailed information on SSBs and/or PRS-SSBs transmitted at the off-raster locations. Note that off-raster SSBs may also be used for other purposes, such as measurements. In such scenarios, it may be advantageous to also allow their use for positioning measurements. In other scenarios, where off-raster SSBs are not used for other purposes and the native SSB bandwidth is not sufficient for positioning purposes, it may alternatively be preferable to define a dedicated positioning measurement signal waveform or sequence that is not necessarily based on the SSB structure.

As a second option, on-raster non-cell-defining SSBs can be used for positioning measurement signals, with transmitted SSBs/PRS-SSBs indicated by the RRC configuration (e.g., in the RMSI or other system information blocks (SIB s) for idle-mode UEs and optionally by dedicated RRC signaling for connected UEs).

As a third option, reserved bits in the PBCH payload can be used to indicate some SSB and/or positioning measurement signal-related information. For example, such a payload may indicate the index into a table of possible SSB and/or positioning measurement signal configurations that is "hard-wired" into the standard specification.

To manage inter-cell interference, there may be network coordination among base stations (gNodeBs, or gNBs, in 5G NR). Such coordination would ensure that the PDSCH and/or other downlink signaling do not collide with positioning measurement signals. The same applies for PRS-on-PRS interference. Coordination can include the time and frequency locations of the transmitted PRS SSBs, and would enable functionality similar to PRS-muting in LTE. This can also include a beam-sweeping sequence to minimize interference based on beam directions. Note that coordination should be easier in frame/system frame number (SFN)-synchronous deployments. Also note that such coordination at the network may be transparent to the UE. In addition, in beamformed systems, it is possible that certain SSBs may be received with low interference even in the absence of such coordination, which may make them good candidates for determining position. Thus, a UE may be allowed to determine its position using such SSBs as well, and may also be allowed to report positioning related information (such as RSTD) based on such SSBs. When RSTDs are reported based on multiple instances of observed PRS SSBs, then a UE may prioritize reports based on SSBs that are designated for use as PRS SSBs over reports based on SSBs that are not designated for positioning measurement signals.

For dedicated positioning measurement signals reusing and/or extending SSB/CSI-RS, a positioning measurement signal can be a sequence on one or both PBCH OFDM symbols (e.g., symbols 420 and 440). The positioning measurement signal may align with the PBCH, or with the PBCH DMRS, on the RBs carrying the PBCH. Positioning measurement signals can also be extended to other RBs to allow for larger positioning measurement signal bandwidth. If only PBCH OFDM symbols are used for such positioning measurement signal bandwidth extension, it would not affect legacy (e.g., Release-15) 5G NR UEs, as they do not detect the PSS/SSS in the extended positioning measurement signal bandwidth. This approach may be used for the SSS OFDM symbols (e.g., symbol 430) as well, to create a larger bandwidth positioning measurement signal. As long as the extension cannot be confused with a valid legacy SSS sequence, legacy UEs will not detect it as such. This can be ensured by appropriate design of the scrambling sequence used in the extension. In particular, the scrambling sequence may simply be an extension of the legacy SSS sequence, i.e., created using the same pseudo-noise (PN) sequence initialization, but outputting more bits from the shift register scrambling generator.

In an aspect, positioning measurement signals can be a subset of CSI-RS/tracking reference signal (TRS), and identified similar to the identification of PRS SSBs as described earlier.

A positioning measurement signal can be a dedicated sequence that also provides functions carried by existing SSB/CSI-RS TRS. For example, QCL information for other channels (downlink and/or uplink) may be provided using a positioning measurement signal as reference. As another example, Layer 1 (L1) reference signal received power (RSRP), radio link monitoring (RLM), and measurements for beam failure recovery (BFR) may all be based on a positioning measurement signal beam, or on signals that are quasi co-located with PRS.

Note that for positioning, the UE needs to receive SSBs from multiple geographic locations. These could be the locations of a base station, an antenna array (e.g., antennas 334) of a base station, a remote radio head (RRH) of a base station, or any combination thereof. Each base station generally configures its own SSBs, and will therefore have its own configuration for which of these SSBs can be used as PRS. The UE needs to receive this configuration information for all of the base stations from which it intends to monitor PRS SSBs. The UE can receive this configuration information in a number of ways. For example, it can be received directly from each base station (e.g., where there is only one base station with multiple RRHs). As another example, it can be received from the serving base station, which consolidates the configuration information from the other base station(s). As yet another example, it can be received from a centralized/core network/location server, such as the location management function (LMF), which consolidates the configuration information from the base stations. The LMF-UE protocol may be the LTE positioning protocol (LPP), which is carried in RRC signaling transparent to the base stations. The base station-LMF protocol is called "NR-PPa." Direct backhaul inter-base station communication is called the "Xn" interface.

Figure 5A:
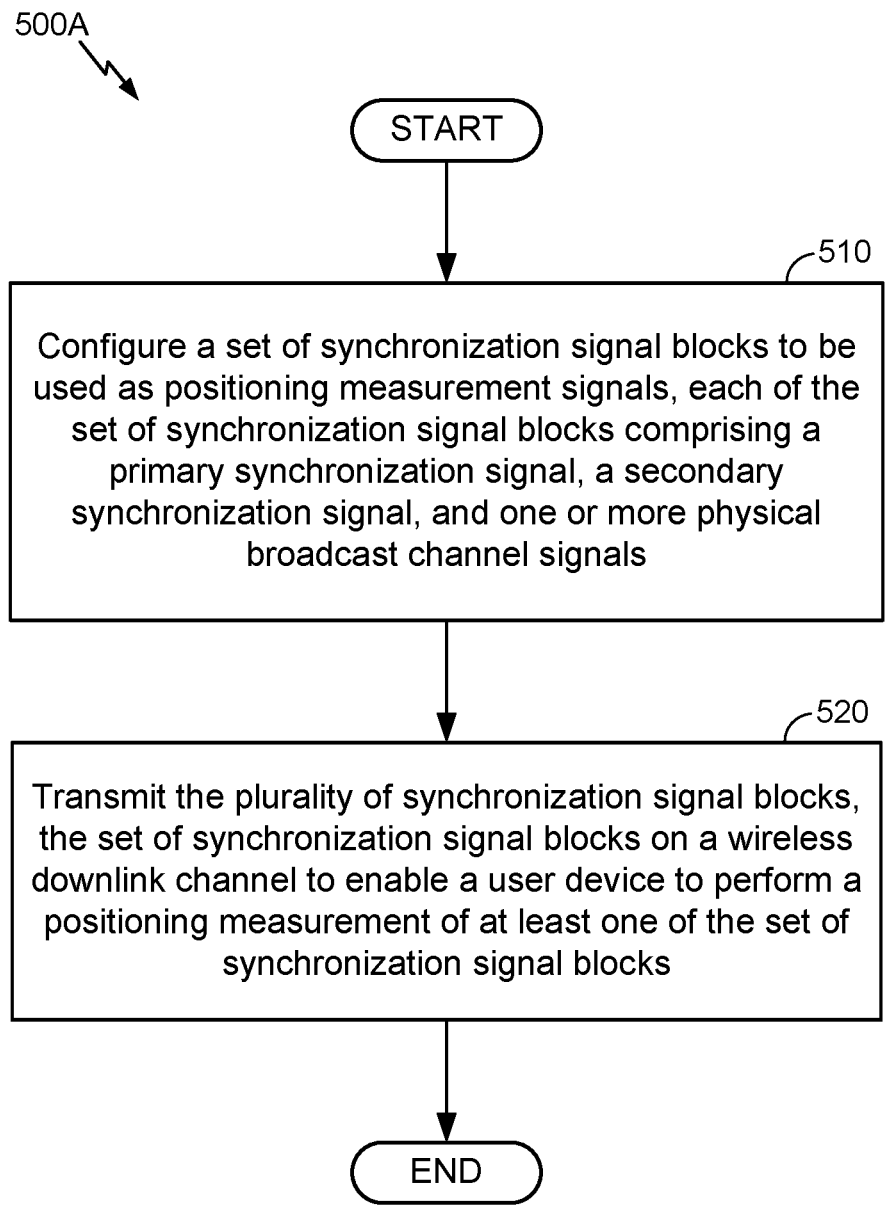
FIGS. 5A and 5B illustrate exemplary methods according to aspects of the disclosure.

FIG. 5A illustrates an exemplary method 500A for utilizing synchronization signal blocks (e.g., SSBs) for positioning operations, according to aspects of the disclosure. The method 500A may be performed by a transmission point (e.g., base station 310, an RRH, an antenna array, such as antennas 334).

At 510, the transmission point (e.g., controller/processor 340, TX MIMO processor 330, and/or transmit processor 320) configures a set (e.g., one or more) of synchronization signal blocks (e.g., SSBs) to be used as positioning measurement signals (e.g., PRS SSBs). In an aspect, as illustrated in FIG. 4, each of the set of synchronization signal blocks may comprise a primary synchronization signal (e.g., PSS), a secondary synchronization signal (e.g., SSS), and one or more physical broadcast channel signals (e.g., PBCH). In an aspect, the set of synchronization signal blocks may each include an index into a table of possible synchronization signal blocks and/or positioning measurement signal configurations.

At 520, the transmission point (e.g., MOD(s) 332 and/or antenna(s) 334, as directed by the controller/processor 340, TX MIMO processor 330, and/or transmit processor 320) transmits the set of synchronization signal blocks on a wireless downlink channel to enable a user device (e.g., a UE) to perform a positioning measurement of at least one of the set of synchronization signal blocks. In an aspect, the transmission point may transmit the set of synchronization signal blocks on multiple radio transmission beams. In an aspect, the transmission of the set of synchronization signal blocks on the multiple radio transmission beams may be indicated by transmission of two or more synchronization signal blocks of the set of synchronization signal blocks sequentially on the same radio transmission beam. In an aspect, the transmission of the set of synchronization signal blocks on the multiple radio transmission beams may be indicated by a synchronization signal block to synchronization signal block quasi-colocation relation, carried in RMSI, in other SIBs, or in dedicated RRC configuration.

In an aspect, the method 500A further includes (not shown) transmitting, by the transmission point (e.g., MOD(s) 332 and/or antenna(s) 334, as directed by the controller/processor 340, TX MIMO processor 330, and/or transmit processor 320), a bitmap representing locations of the set of synchronization signal blocks over a synchronization signal block periodicity, locations of the set of synchronization signal blocks over a positioning measurement signal periodicity, or a combination thereof. In an aspect, the bitmap may represent the locations of the set of synchronization signal blocks among all possible locations of all synchronization signal blocks that could be transmitted by the transmission point, or the locations of the set of synchronization signal blocks among locations of synchronization signal blocks indicated as being transmitted by the transmission point. In an aspect, the set of synchronization signal blocks may include off-synchronization-raster synchronization signal blocks, on-synchronization-raster non-cell-defining synchronization signal blocks, a subset of cell-defining synchronization signal blocks, or any combination thereof. In an aspect, the bitmap may include a first bitmap for the off-synchronization-raster synchronization signal blocks, a second bitmap for the on-synchronization-raster non-cell-defining synchronization signal blocks, and a third bitmap for the subset of cell-defining synchronization signal blocks.

Figure 5B:
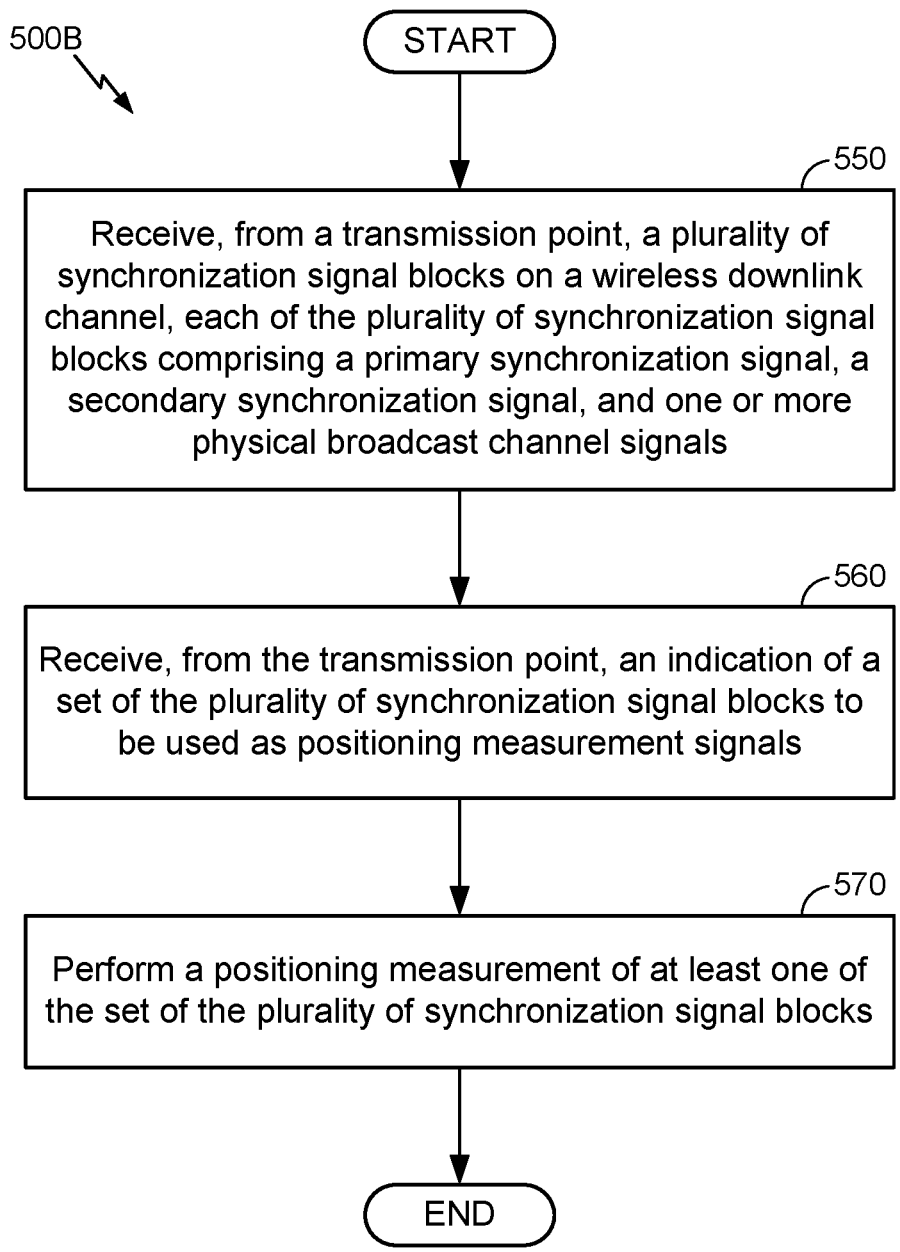

FIG. 5B illustrates an exemplary method 500B for utilizing synchronization signal blocks for positioning operations according to at least on aspect of the disclosure. The method 500B may be performed by a user device (e.g., UE 350).

At 550, the user device (e.g., antenna(s) 352, DEMOD(s) 354, and/or receive processor 358) receives, from a transmission point (e.g., base station 310, an RRH, an antenna array), a plurality of synchronization signal blocks (e.g., SSBs) on a wireless downlink channel. In an aspect, each of the plurality of synchronization signal blocks may comprise a primary synchronization signal (e.g., PSS), a secondary synchronization signal (e.g., SSS), and one or more physical broadcast channel signals (e.g., PBCH). In an aspect, the one or more physical broadcast channel signals of each of the plurality of synchronization signal blocks may comprise two physical broadcast channel signals. In an aspect, the positioning measurement signals of each synchronization signal block of the set of the plurality of synchronization signal blocks may be transmitted on resource blocks of one of the two physical broadcast channel signals or both of the two physical broadcast channel signals.

At 560, the user device (e.g., antenna(s) 352, DEMOD(s) 354, and/or receive processor 358) receives, from the transmission point, an indication of a set of the plurality of synchronization signal blocks to be used as positioning measurement signals (e.g., PRS SSBs). In an aspect, the indication may be a bitmap representing locations of the set of the plurality of synchronization signal blocks over a synchronization signal block periodicity, locations of the set of the plurality of synchronization signal blocks over a positioning measurement signal periodicity, or a combination thereof. In an aspect, the bitmap may represent the locations of the set of the plurality of synchronization signal blocks among all possible locations of all synchronization signal blocks that could be transmitted by the transmission point, or the locations of the set of the plurality of synchronization signal blocks among locations of synchronization signal blocks indicated as being transmitted by the transmission point. In an aspect, the set of the plurality of synchronization signal blocks may include off-synchronization-raster synchronization signal blocks, on-synchronization-raster non-cell-defining synchronization signal blocks, a subset of cell-defining synchronization signal blocks, or any combination thereof. In an aspect, the bitmap may include a first bitmap for the off-synchronization-raster synchronization signal blocks, a second bitmap for the on-synchronization-raster non-cell-defining synchronization signal blocks, and a third bitmap for the subset of cell-defining synchronization signal blocks.

In an aspect, the user device may receive the set of the plurality of synchronization signal blocks on multiple radio transmission beams. In an aspect, reception of the set of the plurality of synchronization signal blocks on the multiple radio transmission beams may be indicated by reception of two or more synchronization signal blocks of the plurality of synchronization signal blocks sequentially on the same radio transmission beam. In an aspect, reception of the set of the plurality of synchronization signal blocks on the multiple radio transmission beams may be indicated by a synchronization signal block to synchronization signal block quasi-colocation relation, carried in RMSI, in other SIBs, or in dedicated RRC configuration.

In an aspect, the set of the plurality of synchronization signal blocks may each include an index into a table of possible synchronization signal blocks and/or positioning measurement signal configurations.

At 570, the user device (e.g., receive processor 358) performs a positioning measurement (e.g., RSTD) of at least one of the set of the plurality of synchronization signal blocks.

Figure 6:
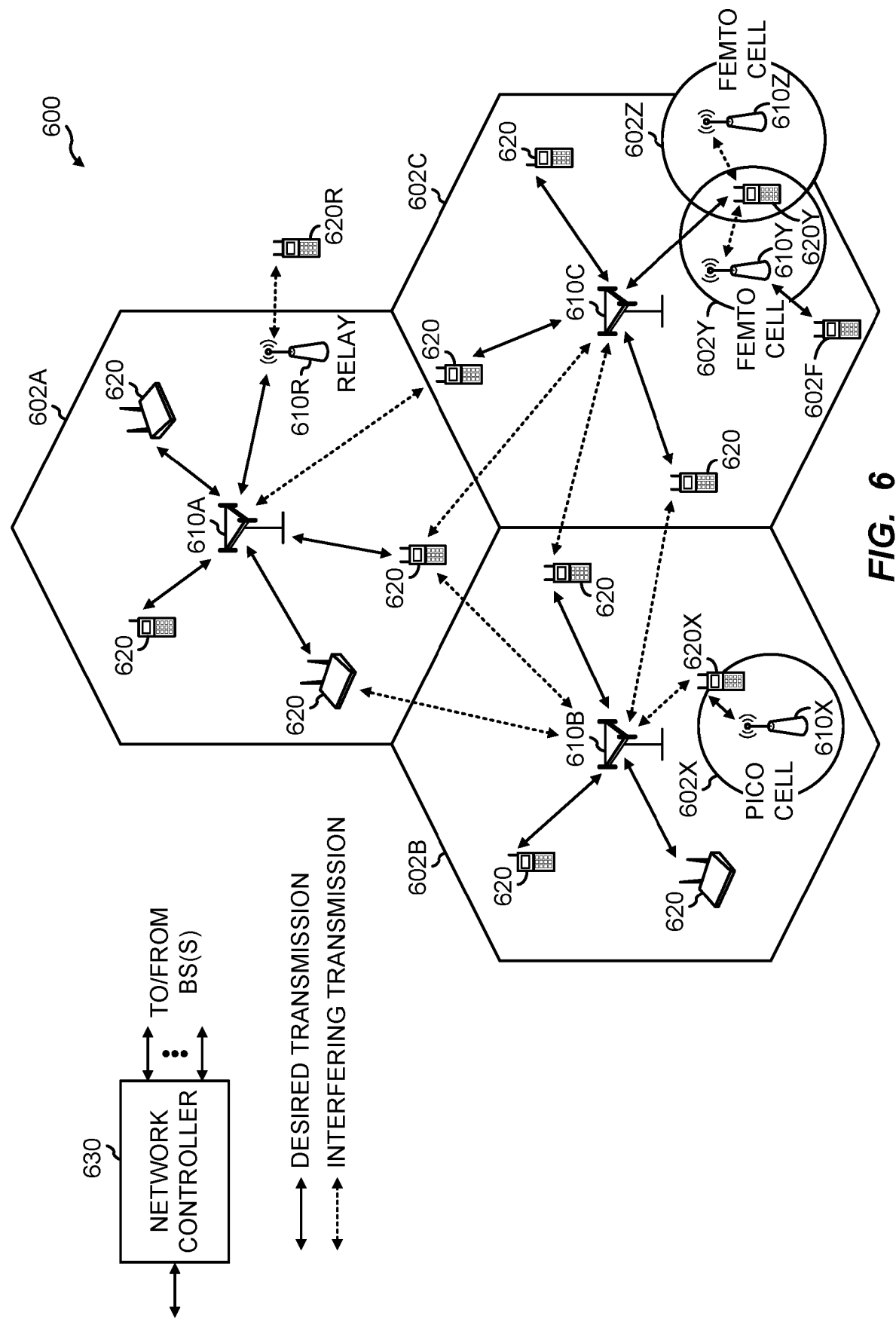
FIG. 6 illustrates an example communication system environment in which the teachings and structures herein may be incorporated.

FIG. 6 illustrates an example communication system environment in which the teachings and structures herein may be may be incorporated. The wireless communication system 600, which will be described at least in part as a 5G NR network for illustration purposes, includes a number of gNBs 610 and other network entities. Each of the gNBs 610 provides communication coverage for a particular geographic area, such as macro cell or small cell coverage areas.

In the illustrated example, the gNBs 610A, 610B, and 610C are macro cell gNBs for the macro cells 602A, 602B, and 602C, respectively. The macro cells 602A, 602B, and 602C may cover a relatively large geographic area (e.g., several kilometers in radius) and may allow unrestricted access by UEs with service subscription. The gNB 610X is a particular small cell gNB referred to as a pico cell gNB for the pico cell 602X. The pico cell 602X may cover a relatively small geographic area and may allow unrestricted access by UEs with service subscription. The gNBs 610Y and 610Z are particular small cells referred to as femto cell gNBs for the femto cells 602Y and 602Z, respectively. The femto cells 602Y and 602Z may cover a relatively small geographic area (e.g., a home) and may allow unrestricted access by UEs (e.g., when operated in an open access mode) or restricted access by UEs having association with the femto cell (e.g., UEs in a Closed Subscriber Group (CSG), UEs for users in the home, etc.), as discussed in more detail below.

The wireless communication system 600 also includes a relay station 610R. A relay station is a station that receives a transmission of data and/or other information from an upstream station (e.g., a gNB or a UE) and sends a transmission of the data and/or other information to a downstream station (e.g., a UE or a gNB). A relay station may also be a UE that relays transmissions for other UEs (e.g., a mobile hotspot). In the example shown in FIG. 6, the relay station 610R communicates with the gNB 610A and a UE 620R in order to facilitate communication between the gNB 610A and the UE 620R. A relay station may also be referred to as a relay gNB, a relay, etc.

The wireless communication system 600 is a heterogeneous network in that it includes gNBs of different types, including macro gNBs, pico gNBs, femto gNBs, relays, etc. These different types of gNBs may have different transmit power levels, different coverage areas, and different impacts on interference in the wireless communication system 600. For example, macro gNBs may have a relatively high transmit power level whereas pico gNBs, femto gNBs, and relays may have a lower transmit power level (e.g., by a relative margin, such as a 10 dBm difference or more).

Returning to FIG. 6, the wireless communication system 600 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. Unless otherwise noted, the techniques described herein may be used for both synchronous and asynchronous operation.

A network controller 630 may couple to a set of gNBs and provide coordination and control for these gNBs. The network controller 630 may communicate with the gNBs 610 via a backhaul. The gNBs 610 may also communicate with one another, e.g., directly or indirectly via a wireless or wireline backhaul.

As shown, the UEs 620 may be dispersed throughout the wireless communication system 600, and each UE may be stationary or mobile, corresponding to, for example, a cellular phone, a personal digital assistant (PDA), a wireless modem, a wireless communication device, a handheld device, a laptop computer, a cordless phone, a wireless local loop (WLL) station, or other mobile entities. In FIG. 6, a solid line with double arrows indicates desired transmissions between a UE and a serving gNB, which is a gNB designated to serve the UE on the downlink and/or uplink. A dashed line with double arrows indicates potentially interfering transmissions between a UE and a gNB. For example, UE 620Y may be in proximity to femto gNBs 610Y, 610Z. Uplink transmissions from UE 620Y may interfere with femto gNBs 610Y, 610Z. Uplink transmissions from UE 620Y may jam femto gNBs 610Y, 610Z and degrade the quality of reception of other uplink signals to femto gNBs 610Y, 610Z.

Small cell gNBs such as the pico cell gNB 610X and femto gNBs 610Y, 610Z may be configured to support different types of access modes. For example, in an open access mode, a small cell gNB may allow any UE (e.g., 620X, 620Y, 602F) to obtain any type of service via the small cell. In a restricted (or closed) access mode, a small cell may only allow authorized UEs to obtain service via the small cell. For example, a small cell gNB may only allow UEs (e.g., so called home UEs) belonging to a certain subscriber group (e.g., a CSG) to obtain service via the small cell. In a hybrid access mode, alien UEs (e.g., non-home UEs, non-CSG UEs) may be given limited access to the small cell. For example, a macro UE that does not belong to a small cell's CSG may be allowed to access the small cell only if sufficient resources are available for all home UEs currently being served by the small cell.

By way of example, femto gNB 610Y may be an open-access femto gNB with no restricted associations to UEs 602F. The femto gNB 610Z may be a higher transmission power gNB initially deployed to provide coverage to an area. Femto gNB 610Z may be deployed to cover a large service area. Meanwhile, femto gNB 610Y may be a lower transmission power gNB deployed later than femto gNB 610Z to provide coverage for a hotspot area (e.g., a sports arena or stadium) for loading traffic from either or both gNB 610C, gNB 610Z.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of wireless communication performed by a transmission point, comprising:
   configuring a set of synchronization signal blocks to be used as measurement signals, each of the set of synchronization signal blocks comprising a primary synchronization signal, a secondary synchronization signal, and one or more physical broadcast channel signals; and
   transmitting the set of synchronization signal blocks on multiple radio transmission beams to enable a user equipment (UE) to perform a measurement of at least one of the set of synchronization signal blocks, wherein transmission of the set of synchronization signal blocks on the multiple radio transmission beams is indicated by a synchronization signal block to synchronization signal block quasi-colocation (QCL) relation, and wherein subsets of the set of synchronization signal blocks have the same QCL relation to provide repetitions of synchronization signal blocks within the set of synchronization signal blocks to enable the set of synchronization signal blocks to be used as the measurement signals.

2. The method of claim 1, further comprising:
   transmitting a bitmap representing locations of the set of synchronization signal blocks over a synchronization signal block periodicity, locations of the set of synchronization signal blocks over a measurement signal periodicity, or a combination thereof.

3. The method of claim 2, wherein the bitmap represents the locations of the set of synchronization signal blocks among all possible locations of all synchronization signal blocks that could be transmitted by the transmission point, or the locations of the set of synchronization signal blocks among locations of synchronization signal blocks indicated as being transmitted by the transmission point.

4. The method of claim 2, wherein the set of synchronization signal blocks comprises off-synchronization-raster synchronization signal blocks, on-synchronization-raster non-cell-defining synchronization signal blocks, a subset of cell-defining synchronization signal blocks, or any combination thereof.

5. The method of claim 4, wherein the bitmap comprises a first bitmap for the off-synchronization-raster synchronization signal blocks, a second bitmap for the on-synchronization-raster non-cell-defining synchronization signal blocks, and a third bitmap for the subset of cell-defining synchronization signal blocks.

6. The method of claim 1, wherein the set of synchronization signal blocks each comprise an index into a table of possible synchronization signal blocks and/or measurement signal configurations.

7. The method of claim 1, wherein the transmission point comprises a base station, a plurality of antennas of a base station, or a remote radio head.

8. A method of wireless communication performed by a user equipment (UE), comprising:
   receiving, from a transmission point, a set of a plurality of synchronization signal blocks on at least one of multiple radio transmission beams of the transmission point, each of the plurality of synchronization signal blocks comprising a primary synchronization signal, a secondary synchronization signal, and one or more physical broadcast channel signals, wherein transmission of the plurality of synchronization signal blocks on multiple radio transmission beams is indicated by a synchronization signal block to synchronization signal block quasi-colocation (QCL) relation;
   receiving an indication of a set of the plurality of synchronization signal blocks to be used as measurement signals, wherein subsets of the set of the plurality of synchronization signal blocks have the same QCL relation to provide repetitions of synchronization signal blocks within the set of the plurality of synchronization signal blocks to enable the set of the plurality of synchronization signal blocks to be used as the measurement signals; and performing a measurement of at least one synchronization signal block of at least one subset of the set of the plurality of synchronization signal blocks.

9. The method of claim 8, wherein the indication comprises a bitmap representing locations of the set of the plurality of synchronization signal blocks over a synchronization signal block periodicity, locations of the set of the plurality of synchronization signal blocks over a measurement signal periodicity, or a combination thereof.

10. The method of claim 9, wherein the bitmap represents the locations of the set of the plurality of synchronization signal blocks among all possible locations of all synchronization signal blocks that could be transmitted by the transmission point, or the locations of the set of the plurality of synchronization signal blocks among locations of synchronization signal blocks indicated as being transmitted by the transmission point.

11. The method of claim 9, wherein the set of the plurality of synchronization signal blocks comprises off-synchronization-raster synchronization signal blocks, on-synchronization-raster non-cell-defining synchronization signal blocks, a subset of cell-defining synchronization signal blocks, or any combination thereof.

12. The method of claim 11, wherein the bitmap comprises a first bitmap for the off-synchronization-raster synchronization signal blocks, a second bitmap for the on-synchronization-raster non-cell-defining synchronization signal blocks, and a third bitmap for the subset of cell-defining synchronization signal blocks.

13. The method of claim 8, wherein the set of the plurality of synchronization signal blocks each comprise an index into a table of possible synchronization signal blocks and/or measurement signal configurations.

14. The method of claim 8, wherein the one or more physical broadcast channel signals of each of the plurality of synchronization signal blocks comprise two physical broadcast channel signals.

15. The method of claim 14, wherein the measurement signals of each synchronization signal block of the set of the plurality of synchronization signal blocks are transmitted on resource blocks of one of the two physical broadcast channel signals or both of the two physical broadcast channel signals.

16. The method of claim 8, wherein the transmission point comprises a base station, a plurality of antennas of a base station, or a remote radio head.

17. The method of claim 8, wherein the UE receives the indication from the transmission point, a serving base station, or a location server.

18. A transmission point, comprising:
a memory;
at least one transceiver; and
at least one processor communicatively coupled to the memory and the at least one transceiver, the at least one processor configured to:
configure a set of synchronization signal blocks to be used as measurement signals, each of the set of synchronization signal blocks comprising a primary synchronization signal, a secondary synchronization signal, and one or more physical broadcast channel signals; and
cause the at least one transceiver to transmit the set of synchronization signal blocks on multiple radio transmission beams to enable a user equipment (UE) to perform a measurement of at least one of the set of synchronization signal blocks, wherein transmission of the set of synchronization signal blocks on the multiple radio transmission beams is indicated by a synchronization signal block to synchronization signal block quasi-colocation (QCL) relation, and wherein subsets of the set of synchronization signal blocks have the same QCL relation to provide repetitions of synchronization signal blocks within the set of synchronization signal blocks to enable the set of synchronization signal blocks to be used as the measurement signals.

19. The transmission point of claim 18, wherein the at least one processor is further configured to:
cause the at least one transceiver to transmit a bitmap representing locations of the set of synchronization signal blocks over a synchronization signal block periodicity, locations of the set of synchronization signal blocks over a measurement signal periodicity, or a combination thereof.

20. The transmission point of claim 19, wherein the bitmap represents the locations of the set of synchronization signal blocks among all possible locations of all synchronization signal blocks that could be transmitted by the transmission point, or the locations of the set of synchronization signal blocks among locations of synchronization signal blocks indicated as being transmitted by the transmission point.

21. The transmission point of claim 19, wherein the set of synchronization signal blocks comprises off-synchronization-raster synchronization signal blocks, on-synchronization-raster non-cell-defining synchronization signal blocks, a subset of cell-defining synchronization signal blocks, or any combination thereof.

22. The transmission point of claim 21, wherein the bitmap comprises a first bitmap for the off-synchronization-raster synchronization signal blocks, a second bitmap for the on-synchronization-raster non-cell-defining synchronization signal blocks, and a third bitmap for the subset of cell-defining synchronization signal blocks.

23. The transmission point of claim 18, wherein the set of synchronization signal blocks each comprise an index into a table of possible synchronization signal blocks and/or measurement signal configurations.

24. The transmission point of claim 18, wherein the transmission point comprises a base station, a plurality of antennas of a base station, or a remote radio head.

25. A user equipment (UE), comprising:
a memory;
at least one transceiver; and
at least one processor communicatively coupled to the memory and the at least one transceiver, the at least one processor configured to:
receive, from a transmission point via the at least one transceiver, a plurality of synchronization signal blocks on at least one of multiple radio transmission beams of the transmission point, each of the plurality of synchronization signal blocks comprising a primary synchronization signal, a secondary synchronization signal, and one or more physical broadcast channel signals, wherein transmission of the plurality of synchronization signal blocks on the multiple radio transmission beams is indicated by a synchronization signal block to synchronization signal block quasi-colocation (QCL) relation;

receive, via the at least one transceiver, an indication of a set of the plurality of synchronization signal blocks to be used as measurement signals, wherein subsets of the set of the plurality of synchronization signal blocks have the same QCL relation to provide repetitions of synchronization signal blocks within the set of the plurality of synchronization signal blocks to enable the set of the plurality of synchronization signal blocks to be used as the measurement signals; and perform a measurement of at least one synchronization signal block of at least one subset of the set of the plurality of synchronization signal blocks.

26. The UE of claim 25, wherein the indication comprises a bitmap representing locations of the set of synchronization signal blocks over a synchronization signal block periodicity, locations the set of synchronization signal blocks over a measurement signal periodicity, or a combination thereof.

27. The UE of claim 26, wherein the bitmap represents the locations of the set of synchronization signal blocks among all possible locations of all synchronization signal blocks that could be transmitted by the transmission point, or the locations of the set of synchronization signal blocks among locations of synchronization signal blocks indicated as being transmitted by the transmission point.

28. The UE of claim 26, wherein the set of the plurality of synchronization signal blocks comprises off-synchronization-raster synchronization signal blocks, on-synchronization-raster non-cell-defining synchronization signal blocks, a subset of cell-defining synchronization signal blocks, or any combination thereof.

29. The UE of claim 28, wherein the bitmap comprises a first bitmap for the off-synchronization-raster synchronization signal blocks, a second bitmap for the on-synchronization-raster non-cell-defining synchronization signal blocks, and a third bitmap for the subset of cell-defining synchronization signal blocks.

30. The UE of claim 25, wherein the set of the plurality of synchronization signal blocks each comprise an index into a table of possible synchronization signal blocks and/or measurement signal configurations.

31. The UE of claim 25, wherein the one or more physical broadcast channel signals of each of the plurality of synchronization signal blocks comprise two physical broadcast channel signals.

32. The UE of claim 31, wherein the measurement signals of each synchronization signal block of the set of the plurality of synchronization signal blocks are transmitted on resource blocks of one of the two physical broadcast channel signals or both of the two physical broadcast channel signals.

33. The UE of claim 25, wherein the transmission point comprises a base station, a plurality of antennas of a base station, or a remote radio head.

34. The UE of claim 25, wherein the transmission point comprises a base station, a plurality of antennas of a base station, or a remote radio head.

35. The UE of claim 25, wherein the at least one transceiver receives the indication from the transmission point, a serving base station, or a location server.

36. A transmission point, comprising:
means for configuring a set of synchronization signal blocks to be used as measurement signals, each of the set of synchronization signal blocks comprising a primary synchronization signal, a secondary synchronization signal, and one or more physical broadcast channel signals; and means for transmitting the set of synchronization signal blocks on multiple radio transmission beams to enable a user equipment (UE) to perform a measurement of at least one of the set of synchronization signal blocks, wherein transmission of the set of synchronization signal blocks on the multiple radio transmission beams is indicated by a synchronization signal block to synchronization signal block quasi-colocation (QCL) relation, and wherein subsets of the set of synchronization signal blocks have the same QCL relation to provide repetitions of synchronization signal blocks within the set of synchronization signal blocks to enable the set of synchronization signal blocks to be used as the measurement signals.

37. A user equipment (UE), comprising:
means for receiving, from a transmission point, a set of a plurality of synchronization signal blocks on at least one of multiple radio transmission beams of the transmission point, each of the plurality of synchronization signal blocks comprising a primary synchronization signal, a secondary synchronization signal, and one or more physical broadcast channel signals, wherein transmission of the plurality of synchronization signal blocks on the multiple radio transmission beams is indicated by a synchronization signal block to synchronization signal block quasi-colocation (QCL) relation;

means for receiving an indication of a set of the plurality of synchronization signal blocks to be used as measurement signals, wherein subsets of the set of the plurality of synchronization signal blocks have the same QCL relation to provide repetitions of synchronization signal blocks within the set of the plurality of synchronization signal blocks to enable the set of the plurality of synchronization signal blocks to be used as the measurement signals; and means for performing a measurement of at least one synchronization signal block of at least one subset of the set of the plurality of synchronization signal blocks.

38. A non-transitory computer-readable medium storing computer-executable instructions, the computer-executable instructions comprising:
at least one instruction instructing a transmission point to configure a set of synchronization signal blocks to be used as measurement signals, each of the set of synchronization signal blocks comprising a primary synchronization signal, a secondary synchronization signal, and one or more physical broadcast channel signals; and at least one instruction instructing the transmission point to transmit the set of synchronization signal blocks on multiple radio transmission beams to enable a user equipment (UE) to perform a measurement of at least one of the set of synchronization signal blocks, wherein transmission of the set of synchronization signal blocks on the multiple radio transmission beams is indicated by a synchronization signal block to synchronization signal block quasi-colocation (QCL) relation, and wherein subsets of the set of synchronization signal blocks have the same QCL relation to provide repetitions of synchronization signal blocks within the set of synchronization signal blocks to enable the set of synchronization signal blocks to be used as the measurement signals.

39. A non-transitory computer-readable medium storing computer-executable instructions, the computer-executable instructions comprising:

at least one instruction instructing a user equipment (UE) to receive, from a transmission point, a set of a plurality of synchronization signal blocks on at least one of multiple radio transmission beams of the transmission point, each of the plurality of synchronization signal blocks comprising a primary synchronization signal, a secondary synchronization signal, and one or more physical broadcast channel signals, wherein transmission of the plurality of synchronization signal blocks on the multiple radio transmission beams is indicated by a synchronization signal block to synchronization signal block quasi-colocation (QCL) relation;

at least one instruction instructing the UE to receive an indication of a set of the plurality of synchronization signal blocks to be used as measurement signals, wherein subsets of the set of the plurality of synchronization signal blocks have the same QCL relation to provide repetitions of synchronization signal blocks within the set of the plurality of synchronization signal blocks to enable the set of the plurality of synchronization signal blocks to be used as the measurement signals; and at least one instruction instructing the UE to perform a measurement of at least one synchronization signal block of at least one subset of the set of the plurality of synchronization signal blocks.

\* \* \* \* \*